(12) United States Patent
Miller et al.

(10) Patent No.: US 10,216,562 B2
(45) Date of Patent: Feb. 26, 2019

(54) GENERATING DIAGNOSTIC DATA

(71) Applicant: International Business Machines Corporation, Armonk, NY (US)

(72) Inventors: Dash D. Miller, St. Louis Park, MN (US); David C. Reed, Tucson, AZ (US); Esteban Rios, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 235 days.

(21) Appl. No.: 15/051,547

(22) Filed: Feb. 23, 2016

(65) Prior Publication Data

US 2017/0242743 A1    Aug. 24, 2017

(51) Int. Cl.
  *G06F 11/00* (2006.01)
  *G06F 11/07* (2006.01)

(52) U.S. Cl.
  CPC ...... *G06F 11/0778* (2013.01); *G06F 11/0709* (2013.01)

(58) Field of Classification Search
  CPC ............. G06F 11/0778; G06F 11/0787; G06F 11/3636; G06F 11/0766; G06F 11/1471
  See application file for complete search history.

(56) References Cited

U.S. PATENT DOCUMENTS

| | | | |
|---|---|---|---|
| 5,644,768 A * | 7/1997 | Periwal | G06F 9/52 718/102 |
| 5,655,075 A * | 8/1997 | Saito | H04L 29/06 714/48 |
| 6,438,713 B1 * | 8/2002 | Taira | G06F 11/3636 714/38.11 |
| 6,792,559 B1 * | 9/2004 | Cohen | G06F 11/261 703/26 |
| 7,383,471 B2 | 6/2008 | Dall | |
| 7,519,779 B2 | 4/2009 | Bakke | |
| 7,716,429 B2 | 5/2010 | Reed et al. | |
| 7,937,623 B2 * | 5/2011 | Ramacher | G06F 11/0748 714/37 |
| 7,962,803 B2 | 6/2011 | Huber et al. | |
| 8,788,887 B2 | 7/2014 | Gilkerson et al. | |
| 9,037,815 B2 | 5/2015 | Helak et al. | |
| 9,519,534 B2 * | 12/2016 | Sugino | G06F 11/0778 |
| 9,684,517 B2 * | 6/2017 | Chen | G06F 9/4406 |
| 9,753,809 B2 * | 9/2017 | Antony | G06F 11/1441 |
| 9,772,894 B2 * | 9/2017 | Parnell | G06F 11/0778 |
| 9,934,084 B2 * | 4/2018 | Hashimoto | G06F 11/0778 |
| 9,946,592 B2 * | 4/2018 | Rasor | G06F 11/0778 |

(Continued)

OTHER PUBLICATIONS

"Method for Automating Diagnostic Data Collection for Software Applications", ip.com, An IP.com Prior Art Database Technical Disclosure, Mar. 6, 2015.

*Primary Examiner* — Loan L. T. Truong
(74) *Attorney, Agent, or Firm* — Kunzler, PC

(57) ABSTRACT

Apparatuses, methods, systems, and computer program products are provided for generating diagnostic data. A trigger module detects a diagnostic trigger for a first address space. A lookup module checks a data structure for one or more second address spaces associated with the first address space. A dump module generates one or more dump files comprising diagnostic data for the first address space and the one or more second address spaces.

18 Claims, 5 Drawing Sheets

(56) References Cited

U.S. PATENT DOCUMENTS

| | | | |
|---|---|---|---|
| 9,952,951 B2* | 4/2018 | Keremane | G06F 11/2069 |
| 2003/0145157 A1* | 7/2003 | Smullen | G06F 11/1441 |
| | | | 711/104 |
| 2003/0188227 A1* | 10/2003 | Maison | G06F 11/0763 |
| | | | 714/42 |
| 2004/0143717 A1* | 7/2004 | Cantrill | G06F 11/366 |
| | | | 711/173 |
| 2005/0028157 A1* | 2/2005 | Betancourt | G06F 9/524 |
| | | | 718/100 |
| 2005/0210077 A1* | 9/2005 | Balakrishnan | G06F 9/4812 |
| 2005/0268053 A1* | 12/2005 | Sexton | G06F 11/3636 |
| | | | 711/159 |
| 2007/0101324 A1* | 5/2007 | Lupu | G06F 9/524 |
| | | | 718/1 |
| 2008/0098209 A1* | 4/2008 | Malaviya | G06F 11/0778 |
| | | | 713/2 |
| 2008/0201705 A1* | 8/2008 | Wookey | G06F 8/658 |
| | | | 717/175 |
| 2008/0209264 A1* | 8/2008 | Morse | G06F 11/0778 |
| | | | 714/6.32 |
| 2009/0106605 A1* | 4/2009 | Kuchibhotla | G06F 11/0748 |
| | | | 714/47.2 |
| 2009/0108067 A1* | 4/2009 | Roquemore | G06K 7/10851 |
| | | | 235/462.15 |
| 2009/0327815 A1* | 12/2009 | Sridharan | G06F 11/0715 |
| | | | 714/38.11 |
| 2010/0268993 A1* | 10/2010 | Chaudhari | G06F 11/0712 |
| | | | 714/39 |
| 2013/0111264 A1* | 5/2013 | Settsu | G06F 11/0778 |
| | | | 714/11 |
| 2013/0290789 A1* | 10/2013 | Wen | G06F 11/079 |
| | | | 714/37 |
| 2014/0006732 A1* | 1/2014 | Helak | G06F 9/00 |
| | | | 711/156 |
| 2014/0095942 A1 | 4/2014 | Harman et al. | |
| 2014/0181359 A1* | 6/2014 | Zhang | G06F 11/1484 |
| | | | 711/6 |
| 2014/0351655 A1* | 11/2014 | Malinowski | G06F 11/0778 |
| | | | 714/45 |
| 2014/0372712 A1 | 12/2014 | Chamberlain et al. | |
| 2015/0006822 A1* | 1/2015 | Geisert | G06F 11/0778 |
| | | | 711/132 |
| 2015/0006963 A1* | 1/2015 | Geisert | G06F 11/0778 |
| | | | 714/38.11 |
| 2015/0089271 A1 | 3/2015 | Shimizu | |
| 2015/0186227 A1* | 7/2015 | Kolassery | G06F 11/167 |
| | | | 714/763 |
| 2015/0186246 A1* | 7/2015 | Fan | G06F 11/366 |
| | | | 714/38.11 |
| 2015/0227316 A1 | 8/2015 | Warfield et al. | |
| 2016/0012200 A1* | 1/2016 | Malinowski | G06F 11/0778 |
| | | | 705/2 |
| 2016/0055043 A1* | 2/2016 | Chikabelapur | G06F 11/079 |
| | | | 714/37 |
| 2016/0125188 A1* | 5/2016 | Hall | H04L 9/0825 |
| | | | 713/164 |
| 2016/0132380 A1* | 5/2016 | Bello | G06F 11/0778 |
| | | | 714/45 |
| 2016/0132381 A1* | 5/2016 | Bello | G06F 11/0778 |
| | | | 714/45 |
| 2016/0154701 A1* | 6/2016 | Desai | G06F 11/1438 |
| | | | 714/19 |
| 2016/0357624 A1* | 12/2016 | Hashimoto | G06F 11/0778 |
| 2017/0024164 A1* | 1/2017 | Yang | G06F 3/0652 |
| 2017/0126580 A1* | 5/2017 | Lo | H04L 43/065 |
| 2017/0185467 A1* | 6/2017 | Xiao | G06F 11/0751 |
| 2017/0235627 A1* | 8/2017 | Rasor | G06F 11/0778 |
| | | | 714/45 |
| 2018/0114018 A1* | 4/2018 | Zhang | G06F 21/562 |

* cited by examiner

GENERATING DIAGNOSTIC DATA

FIELD

The subject matter disclosed herein relates to generating diagnostic data and more particularly relates to generating diagnostic data for multiple address spaces.

BACKGROUND

Diagnostic data can be generated in the event of an error condition on a computer system in order to assist in resolving the error condition. When an error condition is detected for an application, diagnostic data may be generated for the address space where the application is executing. The diagnostic data, however, may not include data for other address spaces associated with the application.

BRIEF SUMMARY

A method for generating diagnostic data is disclosed. An apparatus and computer program product also perform the functions of the method. A method, in one embodiment, includes detecting a diagnostic trigger for a first address space. A method, in certain embodiments, includes checking a data structure for one or more second address spaces associated with a first address space. A method, in a further embodiment, generates one or more dump files comprising diagnostic data for a first address space and one or more second address spaces.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
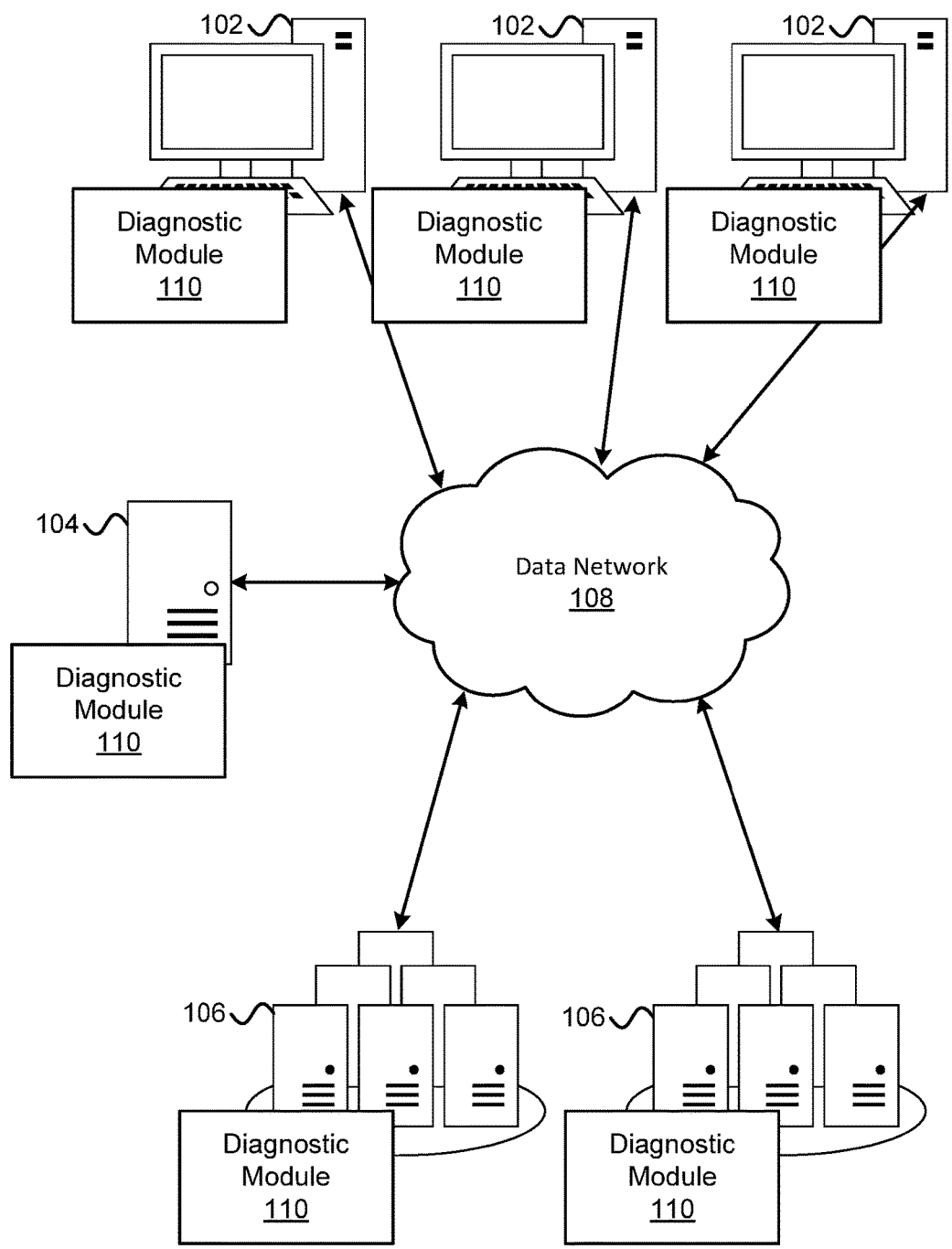
FIG. 1 is a schematic block diagram illustrating one embodiment of a system for generating diagnostic data in accordance with one embodiment of the present invention.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The description of elements in each figure may refer to elements of proceeding figures. Like numbers refer to like elements in all figures, including alternate embodiments of like elements.

FIG. 1 depicts one embodiment of a system 100 for generating diagnostic data in accordance with one embodiment of the present invention. In one embodiment, the system 100 includes one or more computer systems 102, coupling facilities 104, storage systems 106, data networks 108, and diagnostic modules 110. In certain embodiments, even though a specific number of computer systems 102, coupling facilities 104, storage systems 106, data networks 108, and diagnostic modules 110 are depicted in FIG. 1, one of skill in the art will recognize, in light of this disclosure, that any number of computer systems 102, coupling facilities 104, storage systems 106, data networks 108, and diagnostic modules 110 may be included in the system 100 for generating diagnostic data.

The computer systems 102, in one embodiment, may include one or more of a server, a desktop computer, a laptop computer, a tablet computer, a smart phone, a set-top box, a gaming console, a smart TV, a smart watch, a fitness band, an optical head-mounted display (e.g., a virtual reality headset, smart glasses, or the like), an HDMI or other electronic display dongle, a personal digital assistant, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the computer systems 102, are communicatively coupled (e.g., networked) to one or more other computer systems 102, coupling facilities 104, and/or storage systems 106, over the data network 108, described below. The computer systems 102, in some embodiments, are capable of executing various programs, program code, applications, instructions, functions, and/or the like, and may access, store, download, upload, and/or the like data located on one or more storage systems 106.

In one embodiment, the coupling facility 104 is configured to manage communications, data transmissions, and/or the like between the one or more computer systems 102, the one or more storage systems 106, and/or any other computer systems 102 that may be accessible via the data network 108. The coupling facility 104 may be embodied as a server, a desktop computer, a laptop computer, a tablet computer, a smart device, and/or the like. The coupling facility 104 may be embodied as a mainframe computer that allows multiple computer systems 102, processors, and/or the like to access the same data, which may be stored on the one or more storage systems 106.

In one embodiment, the storage systems 106 may be embodied as servers such as blade servers, mainframe servers, tower servers, rack servers, and/or the like. The storage systems 106 may be configured as mail servers, web servers, application servers, FTP servers, media servers, data servers, file servers, virtual servers, and/or the like. In some embodiments, the storage systems 106 may be located on an organization's premises, in a data center, in the cloud, and/or the like. The storage systems 106 may be accessed remotely over a data network 108 like the Internet, or locally over a data network 108 like an intranet. The storage systems 106 may be communicatively coupled to coupling facilities 104, computer systems 102, other storage systems 106, and/or the like over the data network 108.

The data network 108, in one embodiment, includes a digital communication network that transmits digital communications. The data network 108 may include a wireless network, such as a wireless cellular network, a local wireless network, such as a Wi-Fi network, a Bluetooth® network, a near-field communication ("NFC") network, an ad hoc network, and/or the like. The data network 108 may include a wide area network ("WAN"), a storage area network ("SAN"), a local area network ("LAN"), an optical fiber network, the internet, or other digital communication network. The data network 108 may include two or more networks. The data network 108 may include one or more servers, routers, switches, and/or other networking equipment. The data network 108 may also include one or more computer readable storage media, such as a hard disk drive, an optical drive, non-volatile memory, RAM, or the like.

In one embodiment, the system 100 may be configured as a Sysplex® system by IBM® of Armonk, N.Y. In such an embodiment, the system 100 presents multiple system images within multiple computer systems 102 as a single system image. Example solutions provided by such a system include parallel processing; online transaction processing ("OLTP"); very high transaction volumes; very numerous small work units—online transactions, for example (or large work units that can be broken up into multiple small work units); or applications running simultaneously on separate computer systems 102 that may be able to update to a single database without compromising data integrity.

In one embodiment, the system 100 is configured as a Parallel Sysplex® system where the system 100 is a cluster of mainframes (e.g., the computer systems 102) acting together as a single system image. Such a system may be used for disaster recovery by combining data sharing and parallel computing to allow a cluster of multiple computer systems 102 to share a workload for high availability and high performance. Such an embodiment of the system 100 may include a coupling facility 104 that facilitates high-speed communications between devices in the system 100 using specific network channels (e.g., coupling facility links).

The coupling facility 104 may reside on a dedicated, stand-alone server configured with processors that can run an operating system (e.g., coupling facility control code) designed specifically for a coupling facility, as integral processors on the computer systems 102 themselves configured as internal coupling facilities, as logical partitions, and/or the like. The coupling facility 104, in one embodiment, contains lock, list, and cache structures to help with serialization, message passing, and buffer consistency between multiple computer systems 102, storage systems 106, logical partitions, and/or the like.

In one embodiment, the diagnostic module 110 is configured to generate diagnostic data for the system 100 according to an association between address spaces within the system. In certain embodiments, the diagnostic module 110 detects a diagnostic trigger for a first address space. The diagnostic module 110, in a further embodiment, checks a data structure for one or more second address spaces associated with the first address space. The diagnostic module 110, in various embodiments, generates one or more dump files comprising diagnostic data for the first address space and the one or more second address spaces. In this manner, instead of merely generating diagnostic data for a first address space (e.g., the main or base address space) where an application, program, task, job, or the like is executing, the diagnostic module 110 can determine other address spaces that may be related to, dependent on, and/or otherwise associated with the first address space and can generate diagnostic data for these address spaces, which may provide a more detailed diagnostic information for disaster recovery, debugging, and/or the like. The diagnostic module 110, including its various sub-modules 202-304, may be located on one or more computer systems 102, one or more coupling facilities 104, one or more storage systems 106, one or more network devices (e.g., switches, routers, bridges, or the like), and/or the like. The diagnostic module 110 is described in more detail below with reference to FIGS. 2 and 3.

In various embodiments, the diagnostic module 110 may be embodied as a hardware appliance that can be installed or deployed on a computer system 102, a coupling facility 104, a storage system 106, and/or elsewhere on the data network 106. In certain embodiments, the diagnostic module 110 may include a hardware device such as a secure hardware dongle or other hardware appliance device (e.g., a set-top box, a network appliance, or the like) that attaches to a device such as a laptop computer, a server, a tablet computer, a smart phone, or the like, either by a wired connection (e.g., a USB connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the diagnostic module 110 may include a power interface, a wired and/or wireless network interface, a graphical interface that attaches to a display, and/or a semiconductor integrated circuit device as described below, configured to perform the functions described herein with regard to the diagnostic module 110.

The diagnostic module 110, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the diagnostic module 110 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the diagnostic module 110.

The semiconductor integrated circuit device or other hardware appliance of the diagnostic module 110, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the diagnostic module 110 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

Figure 2:
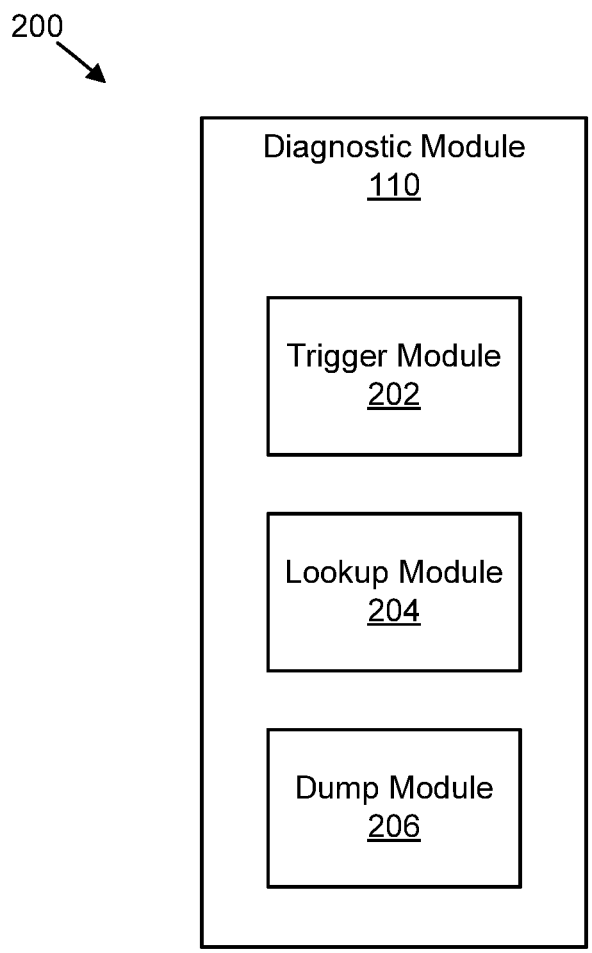
FIG. 2 is a schematic block diagram illustrating one embodiment of a module for generating diagnostic data in accordance with one embodiment of the present invention.

FIG. 2 depicts one embodiment of a module 200 for generating diagnostic data in accordance with one embodiment of the present invention. In one embodiment, the module 200 includes an embodiment of a diagnostic module 110. The diagnostic module 110 may include one or more of a trigger module 202, a lookup module 204, and a dump module 206, which are described in more detail below.

The trigger module 202, in one embodiment, is configured to detect a diagnostic trigger for an address space. As used herein, an address space may be a range of addresses that correspond to a logical or physical memory space of a computer. When an application, program, job, and/or the like is executed on a computer, for example, the operating system may define a base or main address space for the application to execute in (e.g., a range of addresses in RAM to store instructions, data, and/or the like). The address space may refer to a range of memory addresses for main memory (e.g., RAM), memory-mapped I/O, virtual memory, sector addresses for a disk drive, and/or the like.

In some embodiments, a computer system 102 may be referenced using a unique identifier. In such an embodiment, each computer system 102 in the system 100 is assigned a unique identifier. In one embodiment, an address space may be identified using an identifier that is unique for the computer system 102 where the address space is located. Accordingly, to reference a particular address space, a computer system 102 identifier and an address space identifier may be used because address spaces may be unique per computer system 102, and not unique within the entire system 100. For example, system A with identifier 1234 may have address space A with identifier ABCD, and system B with identifier 5678 may have address space B with identifier ABCD, which is the same as the identifier for address space A located on system A. Thus, to reference address space A on system A, in one example, an identifier that combines the system identifier and the address space identifier such as 1234_ABCD may be used, and to reference address space B on system B an identifier such as 5678_ABCD may be used. Alternatively, the system identifier and the address space identifier may be stored and accessed separately.

In one embodiment, the diagnostic trigger may include a detected program crash, a received error message, a detected error condition, and/or the like. For example, the trigger module 202 may receive a message, signal, or other notification that a program has crashed or has otherwise stopped functioning properly. The trigger module 202 may detect other diagnostic triggers such as resource contention situations that may cause a program to hang or suspend for a predetermined period of time, errors caused by logical dependencies, and/or the like, which are described in more detail below.

The lookup module 204, in one embodiment, is configured to check a data structure for one or more address spaces associated with the base or main address space for an application. The data structure, as used herein, may be a database, a list, a table, and/or the like. The lookup module 204 may reference the data structure using a key of a key-value pair. In such an embodiment, the key may be some combination of a system identifier where the main address space is located and the identifier for the main address space. The value returned to the lookup module 204 based on the given key is a list of one or more address spaces that are associated with the main address space, e.g., a list comprising the system identifier for the computer system 102 where an address space is located and the address space identifier for the particular computer system 102 for each address space associated with the main address space.

In one embodiment, the data structure is created the first time an address space is provisioned or referenced when an application is executed. In certain embodiments, the data structure is given a default size such as 20 cylinders, 10 MB, 50 entries, and/or the like. In some embodiments, the data structure is dynamically resizable. For example, the size of the data structure may grow or shrink as entries are dynamically added and removed from the data structure. In some embodiments, a single data structure is created for all applications, jobs, programs, and/or the like executing within the system 100. In certain embodiments, a separate data structure is created for each application, job, program, and/or the like executing within the system 100. The data structure, or a plurality of data structures, may be stored in a central location, such as on the coupling facility device 104, on a computer system 102, on a storage system 106, and/or on a different networked device.

As used herein, an address space may be associated with the main or base address space for a program if an address space, or a program executing with an address space, can affect the execution, functionality, integrity, and/or the like of the program. For example, if application A uses a shared resource with application B, such as shared memory, the address space that application B is executing in may have an effect on the execution of application A if application B locks access to the shared resource while it is using the shared resource, and then fails to unlock the shared resource for application A. During debugging, in conventional diagnostic systems, diagnostic data may only be generated for the address space where application A is located, and not for the address space where application B is located, which may be the real cause of the error condition. As disclosed herein, however, the lookup module 204 may determine, after checking the data structure, that the address space for application B is associated with the address space for application A, and therefore, diagnostic data should also be generated for the address space where application B is located.

In certain embodiments, the main address space for an application and one or more associated address spaces may be located on the same computer system 102 within the system 100. In various embodiments, the main address space and one or more associated address spaces may be located on different computer systems 102 within the system 100. In some embodiments, the data structure may be maintained by a coupling facility 104, which may add and remove entries in the data store and/or facilitate the lookup and transfer of information into and out of the data structure.

The dump module 206, in one embodiment, is configured to generate one or more dump files that include diagnostic data for the main address space and one or more other address spaces associated with the main address space. As used herein, diagnostic data may include a copy of at least a portion of a computer system's 102 memory at the time of a crash, or other error condition that causes a program to cease execution. Diagnostic data, for example, may include data stored in processor registers, caches, main memory, and/or the like such as instructions, addresses, codes, and/or the like.

As described above, the main address space and the address spaces associated with the main address space may be located on the same or different computer systems 102 in the system 100. In one embodiment, the dump module 206 may generate a single dump file that includes the diagnostic information for each of the main address space and the associated address spaces. In some embodiments, the dump module 206 may generate a dump file for each computer system 102 that includes an address space being referenced. For example, if the main address space is located on computer system A, and associated address spaces are located on computer systems B and C, the dump module 206 may generate a separate dump file for each of the computer systems A, B, and C. In such an embodiment, if multiple address spaces are located on a computer system 102, the dump module 206 may generate a separate dump file for each address space or a single dump file that includes diagnostic information for all the address spaces being referenced on the computer system 102. Thus, if system A includes address spaces 1234 and 5678 associated with the main address space, the dump module 206 may generate and store separate dump files for each address space or a single dump file for both address spaces.

Figure 3:
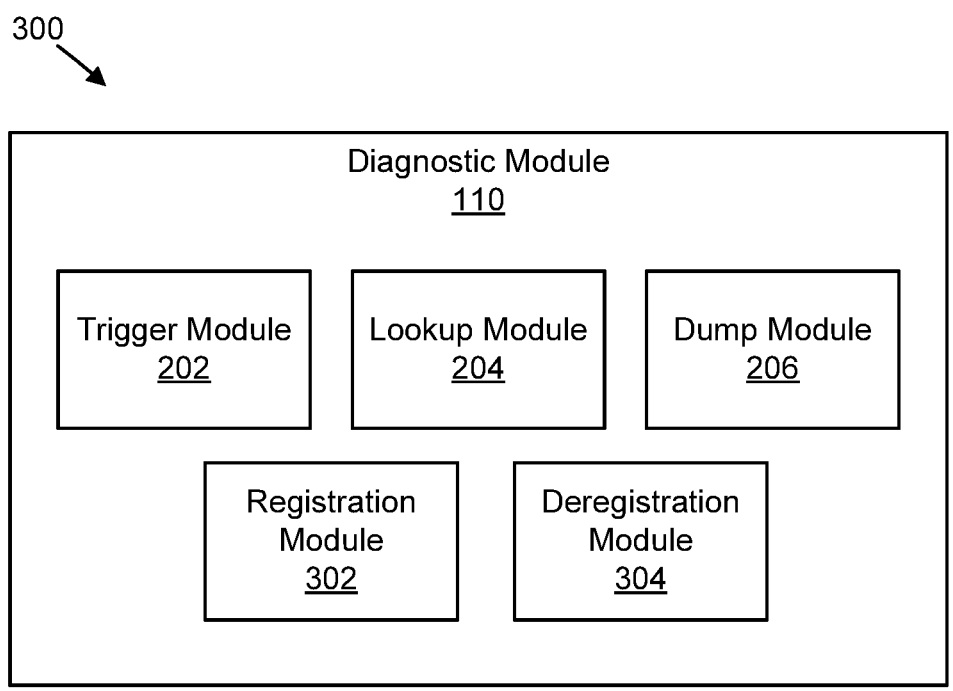
FIG. 3 is a schematic block diagram illustrating one embodiment of a module for generating diagnostic data in accordance with one embodiment of the present invention.

FIG. 3 depicts one embodiment of a module 300 for generating diagnostic data in accordance with one embodiment of the present invention. In one embodiment, the module 300 includes an embodiment of a diagnostic module 110. The diagnostic module 110, in some embodiments, include one or more of a trigger module 202, a lookup module 204, and a dump module 206, which may be substantially similar to the trigger module 202, the lookup module 204, and the dump module 206 described above with reference to FIG. 2. In a further embodiment, the diagnostic module 110 includes one or more of a registration module 302 and a deregistration module 304, which are described below in more detail.

The registration module 302, in one embodiment, is configured to dynamically create an entry in the data structure that associates the main address space with a different address space. In some embodiments, the registration module 302 dynamically creates an entry in the data structure for the main address space in response to the main address space referencing a different address space during execution of a program, application, job, and/or the like.

In one embodiment, the registration module 302 creates the entry in response to receiving registration information for the main address space and an associated address space. The registration information, in some embodiments, includes an address space identifier and a system identifier for the computer system 102 where the address space is located. The registration information may also include an address space identifier for the main address space and the system identifier for the computer system 102 where the address space is located. In certain embodiments, as described above, the identification information (e.g., the address space identifier and the computer system identifier) for the main address space may be used as a key in the data structure, and the identification information (e.g., the address space identifier and the computer system identifier) for the associated address space may be used as a value associated with the key.

In certain embodiments, the registration module 302 receives registration information for one or more address spaces associated with the main address space from an application executing in the main address space. In such an embodiment, the application determines and/or specifies different address spaces that may be associated with the main address space. For example, the application may provide registration information to the registration module 302 that specifies a particular address space associated with a read operation before the application performs the read operation. The registration module 302 may add the address space identifier and the computer system identifier for the associated address space to the data structure. Accordingly, in response to a diagnostic trigger event associated with the main address space during the read operation, the lookup module 204 can check the data structure for address spaces associated with the main address space (e.g., the address space for the read operation), and the dump module 206 can generate diagnostic data for the main address space and the address space associated with the read operation.

Some other examples of operations performed by an application that may trigger the application to provide registration information for an associated address space may include write operations in a different address space, opening/reading/saving files in a different address space, calculating performance metrics for a different address space, and/or the like. In certain embodiments, the application provides registration information to the registration module 302 for a subset of address spaces that are referenced by the application running in the main address space. For example, an application programmer may specify (e.g., in the source code) which address spaces to register with the registration module 302 that are of interest to the application programmer, which may be less than the total number of address spaces that are referenced by the application while the application executes. In this manner, diagnostic information can be generated for selected address spaces of interest, and not necessarily for all address spaces associated with the main address space.

In a further embodiment, the registration module 302 receives registration information for an address space associated with the main address space from a service monitoring execution of the application in the main address space. The service may select an associated address space to register based on one or more monitoring parameters such as contention situations, logical dependencies, program hang situations for a predetermined period of time, and/or the like. In one embodiment, an operating system service may monitor for contention situations for a shared resource where locks and latches are used to control access to the shared resource. The detection of a contention or hang situation may be a detected error condition that generates a diagnostic trigger detected by the trigger module 202.

For example, in virtual storage access method ("VSAM"), record level sharing ("RLS") latches and Sysplex®-wide locks may be used for serialization, which may cause various hang situations. If RLS detects a situation where Job A, executing in address space 1234, is waiting on a resource held by Job B, executing in address space 5678, and Job B is waiting on a different resource held by Job C, executing in address space 2468, RLS (or a different service) can issue a contention query associated with Job A to identify other jobs that may be the cause of the hang situation (e.g., Jobs B and C). Accordingly, identification information for the address spaces for Jobs B and C may be provided to the registration module 302 and added to the data structure as address spaces associated with the main address space.

In a further embodiment, a service or application may provide a resource identifier to the registration module 302 to be analyzed for contention during execution of an application in the main address space. For example, if an application attempts to read/write to shared memory, the service monitoring the application may provide the shared memory identifier to the registration module 302 for contention analysis to determine other address spaces that may be associated with the shared memory. The registration module 302 may register the determined address spaces in the data structure so that they are associated with the main address space.

In some embodiments, an application or a service monitoring the application may determine logical dependencies between the main address space and one or more associated address spaces, e.g., the processing in the main address space cannot continue until processing in a logically dependent address space is complete. For example, extended remote copy ("XRC") by IBM® is a program used to provide continuous data availability in a disaster recovery or workload movement environment by utilizing one or more system data movers executing in different address spaces that move large amounts of data between storage devices. When multiple system data movers are tightly coupled, they may be highly dependent on each other. One system data mover, for example, may delay processing of other system data movers, and, ultimately, the formation of consistency groups. A system data mover, or a service monitoring the system data mover, may issue an error message when such a logical dependency is detected so that the address space of the system data mover that is causing the error can be registered by the registration module 302 in the data structure as an associated address space of the main address space.

In one embodiment, the registration module 302 receives registration information for an address space associated with the main address space from a user. For example, a programmer, administrator, quality assurance personnel, and/or the like may manually specify particular address spaces to associate with the main address space before the application is executed, during execution of the application (e.g., during debugging), and/or the like. In such an embodiment, the user may utilize a registration service (e.g., a service provided by an operating system) that allows the user to specify an identifier for the associated address space and an identifier for the system where the associated address space is located.

In one embodiment, the deregistration module 304, is configured to dynamically remove from the entry in the data structure for the main address space identification information (e.g., an address space identifier and a system identifier for the computer system 102 where the address space is located) for an address space associated with the main address space. In some embodiments, the deregistration module 304 dynamically removes identification information for an associated address space while an application is executing in the main address space.

In a further embodiment, the deregistration module 304 removes identification information for an associated address space in response to the resolution of a condition that causes the diagnostic trigger. For instance, in the contention situation example above, if RLS determines that a contention situation between Job A and Job B has been resolved, the deregistration module 304 may remove the identification information for the address space associated with Job B from the entry in the data structure for the address space for Job A. Similarly, if a logical dependency is resolved or removed, the deregistration module 304 may remove the identification information for the address space associated with the application causing the error condition due to the logical dependency.

In a further embodiment, the deregistration module 304 removes identification information for an associated address space in response to the associated address no longer being referenced by the application executing in the main address space. For example, if an application provided identification information to the registration module 302 for an address space associated with a write operation, after the write operation is complete, the deregistration module 304 may remove the identification information for the associated address space for the write operation from the entry for the main address space in the data structure.

Figure 4:
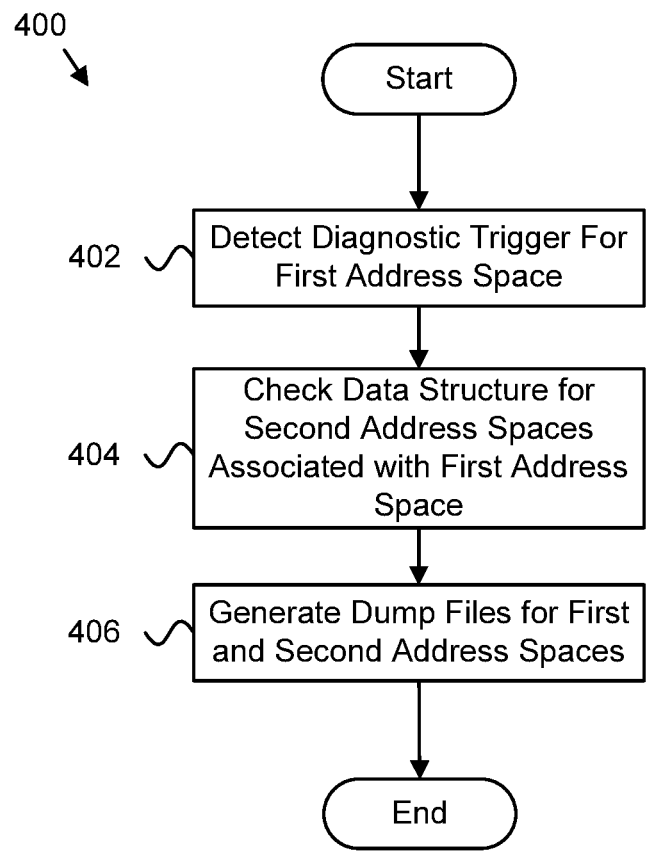
FIG. 4 is a schematic flow chart diagram illustrating one embodiment of a method for generating diagnostic data in accordance with one embodiment of the present invention.

FIG. 4 depicts one embodiment of a method 400 for generating diagnostic data in accordance with one embodiment of the present invention. In one embodiment, the method 400 begins and the trigger module 202 detects 402 a diagnostic trigger for a first address space, e.g., the main address space for an executing application. The lookup module 204, in some embodiments, checks 404 a data structure for one or more second address spaces associated with the first address space. The dump module 206, in a further embodiment, generates 406 one or more dump files that include diagnostic data for the first address space and the one or more second address spaces, and the method 400 ends.

Figure 5:
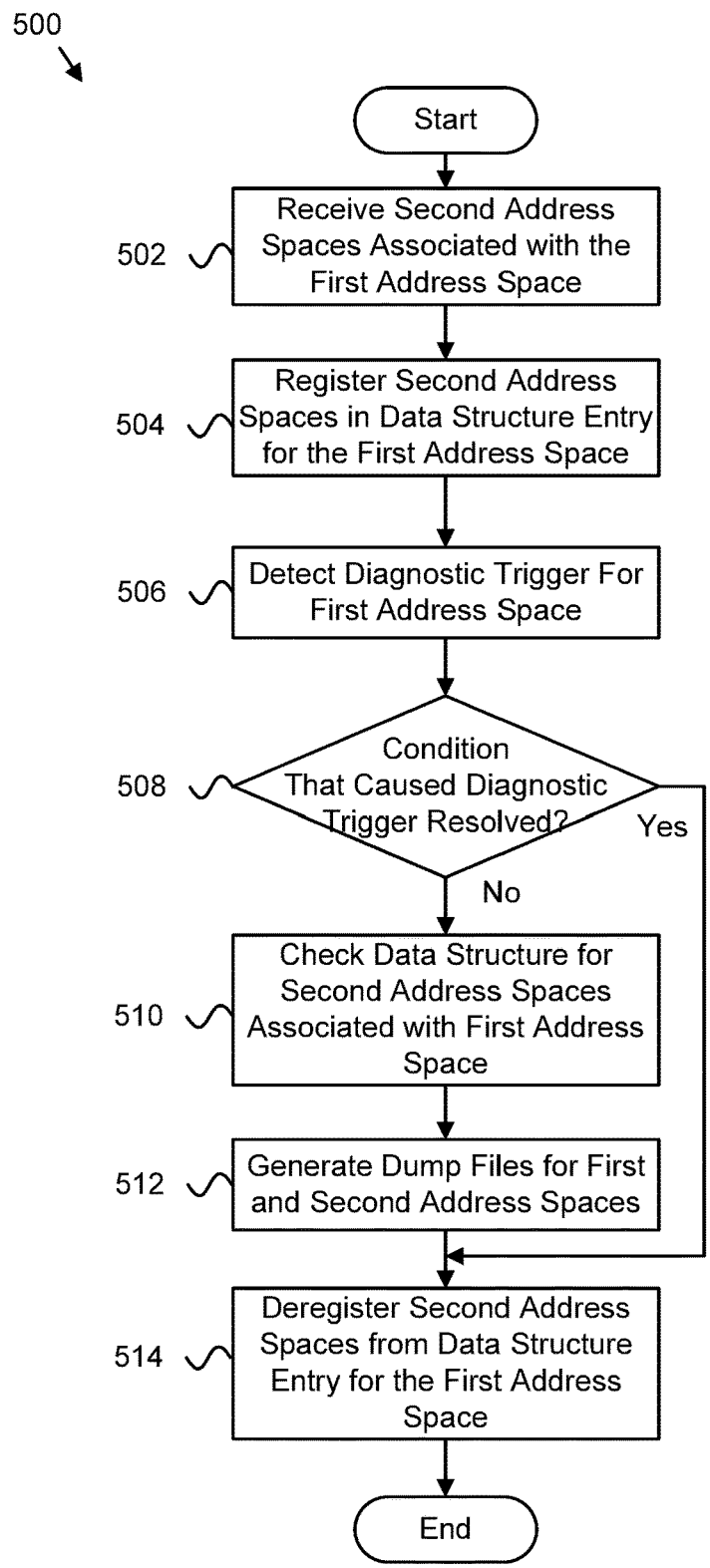
FIG. 5 is a schematic flow chart diagram illustrating one embodiment of a method for generating diagnostic data in accordance with one embodiment of the present invention.

FIG. 5 depicts one embodiment of a method 500 for generating diagnostic data in accordance with one embodiment of the present invention. In one embodiment, the method 500 begins and the registration module 302 receives 502 identifiers for one or more second address spaces associated with the first address space (e.g., the main address space) for an executing application. In some embodiments, the registration module 302 receives 502 the identifiers for the associated address spaces from an application, a service, a user, and/or the like.

In a further embodiment, the registration module 302 dynamically registers 504 the identifiers for the second address spaces in the data structure entry for the first address space. In some embodiments, the trigger module 202 detects 506 a diagnostic trigger, such as a crash, an error message, an error condition, and/or the like, associated with the first address space. The trigger module 202 may determine 508 whether the error condition that caused the diagnostic trigger has been resolved. If so, then the deregistration module 304 deregisters 514 the second address space from the data structure entry from the first address space, and the method 500 ends.

If the trigger module 202 determines 508 that the error condition that caused the diagnostic trigger has not been resolved, then the lookup module 204, in some embodiments, checks 510 a data structure for one or more second address spaces associated with the first address space. The dump module 206, in a further embodiment, generates 512 one or more dump files that include diagnostic data for the first address space and the one or more second address spaces. The deregistration module 304 deregisters 514 the second address space from the data structure entry from the first address space, and the method 500 ends.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor;
   a memory storing code executable by the processor to:
   detect that a first address space of an application references one or more second address spaces during execution of the application, the first address space comprising a main address space for the execution of the application and the one or more second address spaces comprising address spaces that comprise information that the application references during execution;
   dynamically create an entry in a data structure for mapping the first address space of an application executing in the first address space to the one or more second address spaces in response to detecting the application referencing the one or more second address spaces during execution of the application;
   if, during execution of the application, a diagnostic trigger for the first address space is detected:
      check the data structure for one or more second address spaces mapped to the first address space; and
      generate one or more dump files comprising diagnostic data for the first address space and the one or more second address spaces; and
   if, during execution of the application, a diagnostic trigger for the address space is not detected and a second address space of the one or more second address spaces is no longer referenced by the first address space, dynamically remove the entry in the data structure of the mapping of the first address space to the second address space that is no longer referenced by the first address space.

2. The apparatus of claim 1, wherein the code is further executable by the processor to receive registration information for the one or more second address spaces from an application executing in the first address space, the application specifying which second address spaces to associate with the first address space.

3. The apparatus of claim 1, wherein the code is further executable by the processor to receive registration information for the one or more second address spaces from a service monitoring execution of the application in the first address space, the service selecting the one or more second address spaces based on one or more monitoring parameters.

4. The apparatus of claim 1, wherein the code is further executable by the processor to receive registration information for the one or more second address spaces from a user, the user manually specifying the one or more second address spaces.

5. The apparatus of claim 1, wherein the entry comprises a key-value pair where the key comprises an identifier for the first address space and an identifier for a system where the first address space is located, and the value comprises an identifier for each of the one or more second address spaces and an identifier for each system where each of the one or more second address spaces is located.

6. The apparatus of claim 5, wherein the code is further executable by the processor to check the data structure for the one or more second address spaces using a key comprising an address space identifier and a system identifier for the first address space.

7. The apparatus of claim 1, wherein an entry for the first address space is dynamically added to the data structure in response to executing a program in the first address space.

8. The apparatus of claim 1, wherein removing the entry in the data structure of the mapping of the first address space to the one or more second address spaces comprises removing an identifier for a second address space of the one or more second address spaces associated with the first address space and an identifier for a system where the second address space of the one or more second address spaces is located.

9. The apparatus of claim 1, wherein the diagnostic trigger comprises one or more of a crash, an error message, and a detected error condition.

10. The apparatus of claim 9, wherein the detected error condition is a contention condition associated with a system resource, the contention condition detected in response to a program hanging for a predetermined period of time.

11. The apparatus of claim 9, wherein an error message is generated in response to detecting an error condition caused by a logical dependency between the first address space and at least one of the one or more second address spaces.

12. The apparatus of claim 1, wherein the first address space and the one or more second address spaces are located on a plurality of devices, each of the plurality of devices being connected over a data network, and wherein the data structure is maintained by a coupling facility connected to each of the plurality of devices over the data network.

13. The apparatus of claim 1, wherein the code is further executable by the processor to generate one or more of a dump file for each of the first address space and the one or more second address spaces and a dump file for each device of a plurality of devices that comprises one or more of the first address space and the one or more second address spaces.

14. A method comprising:
- detecting that a first address space of an application references one or more second address spaces during execution of the application, the first address space comprising a main address space for the execution of the application and the one or more second address spaces comprising address spaces that comprise information that the application references during execution;
- dynamically creating an entry in a data structure for mapping the first address space of an application executing in the first address space to the one or more second address spaces in response to detecting the application referencing the one or more second address spaces during execution of the application;
- if, during execution of the application, a diagnostic trigger for the first address space is detected:
  - checking the data structure for one or more second address spaces mapped to the first address space; and
  - generating one or more dump files comprising diagnostic data for the first address space and the one or more second address spaces; and
- if, during execution of the application, a diagnostic trigger for the address space is not detected and a second address space of the one or more second address spaces is no longer referenced by the first address space, dynamically removing the entry in the data structure of the mapping of the first address space to the second address space that is no longer referenced by the first address space.

15. The method of claim 14, further comprising receiving registration information for the one or more second address spaces from an application executing in the first address space, the application specifying which second address spaces to associate with the first address space.

16. The method of claim 14, further comprising receiving registration information for the one or more second address spaces from a service monitoring execution of the application in the first address space, the service selecting the one or more second address spaces based on one or more monitoring parameters.

17. The method of claim 14, further comprising receiving registration information for the one or more second address spaces from a user, the user manually specifying the one or more second address spaces.

18. A computer program product comprising a non-transitory computer readable storage medium having program instructions embodied therewith, the program instructions readable/executable by a processor to cause the processor to:
- detect, by processor, that a first address space of an application references one or more second address spaces during execution of the application, the first address space comprising a main address space for the execution of the application and the one or more second address spaces comprising address spaces that comprise information that the application references during execution;
- dynamically create, by processor, an entry in a data structure for mapping the first address space of an application executing in the first address space to the one or more second address spaces in response to detecting the application referencing the one or more second address spaces during execution of the application;
- if, during execution of the application, a diagnostic trigger for the first address space is detected:
  - check, by processor, the data structure for one or more second address spaces mapped to the first address space; and
  - generate, by processor, one or more dump files comprising diagnostic data for the first address space and the one or more second address spaces; and
- if, during execution of the application, a diagnostic trigger for the address space is not detected and a second address space of the one or more second address spaces is no longer referenced by the first address space, dynamically remove, by processor, the entry in the data structure of the mapping of the first address space to the second address space that is no longer referenced by the first address space.

* * * * *